3,521,482
APPARATUS FOR MEASURING VISCOSITY
Gene M. Griffith and Roger S. Leiser, Decatur, Ill., assignors to A. E. Staley Manufacturing Company, Decatur, Ill., a corporation of Delaware
Filed Oct. 8, 1968, Ser. No. 765,814
Int. Cl. G01n *11/06*
U.S. Cl. 73—56                                                  11 Claims

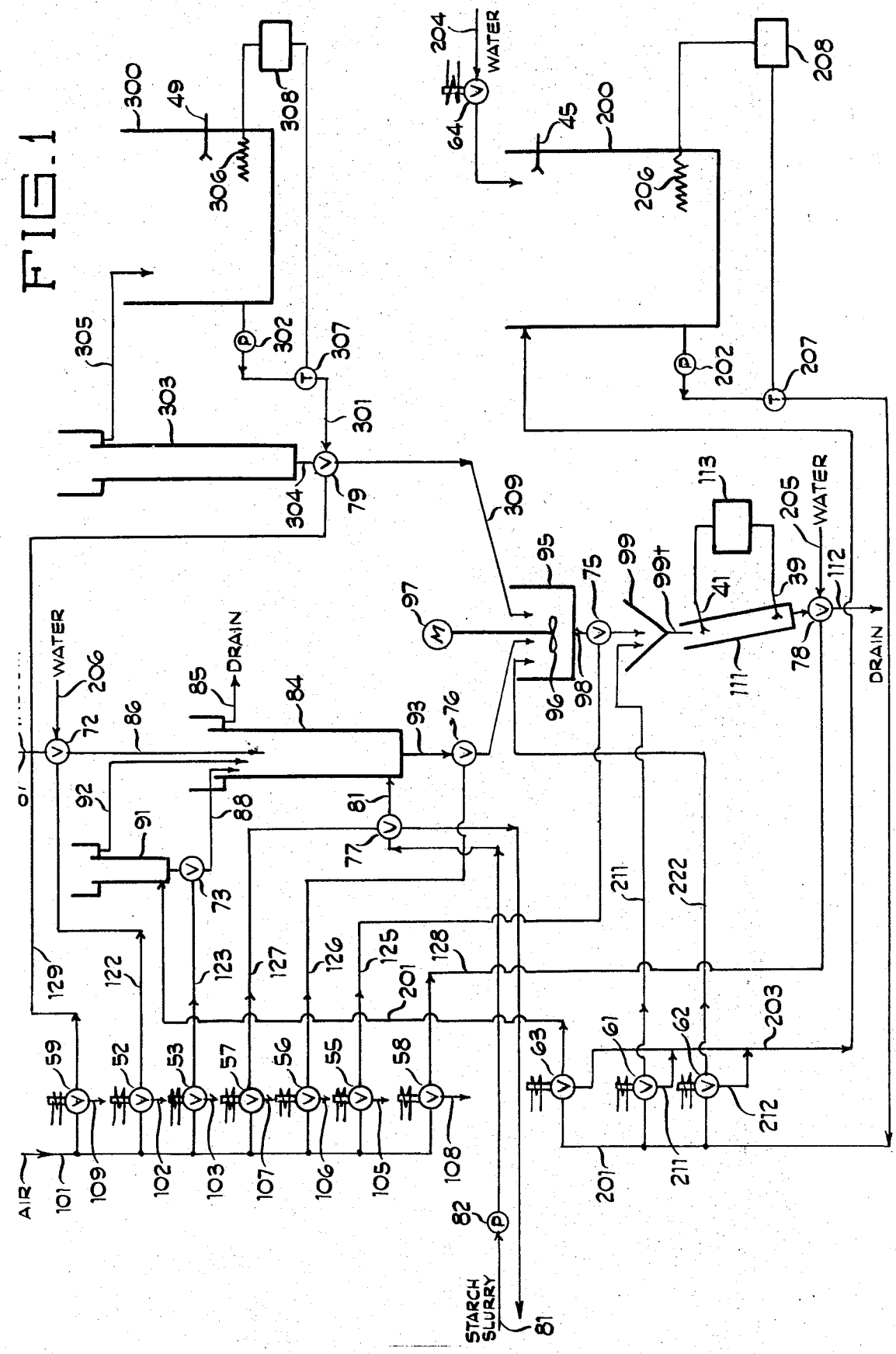

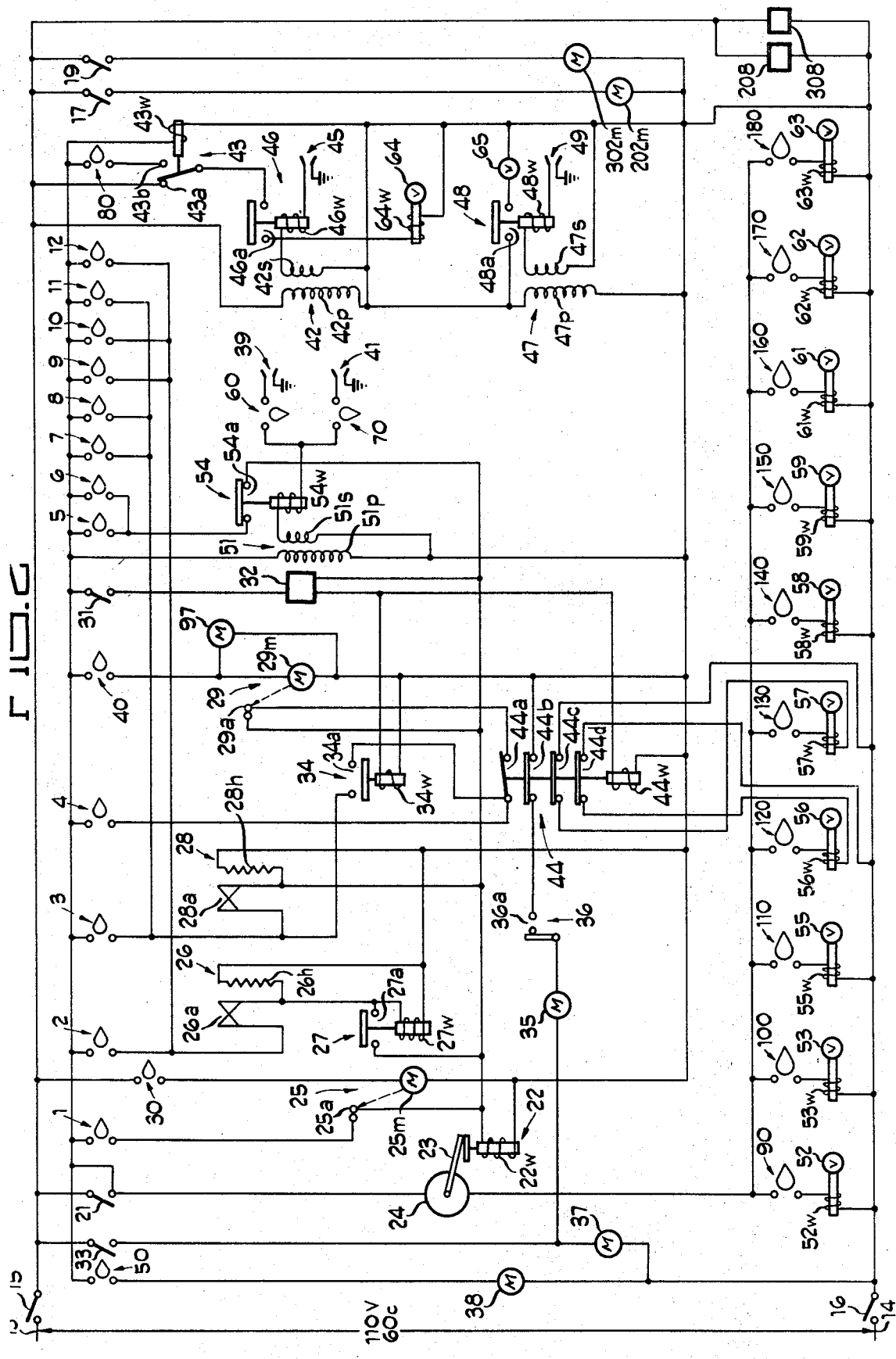

ABSTRACT OF THE DISCLOSURE

An apparatus for determining the viscosity of each of a plurality of successive reaction products, each of which is formed by extracting a predetermined quantity of material being processed, diluting it to a standard condition, allowing it to react for a predetermined period under controlled conditions, adding a treating reagent thereto, and measuring the time taken for the reaction product to pass through an orifice and fill a container of a given configuration to a predetermined level. A preferred embodiment includes a water supply tank with temperature and level controls, a caustic or other treating solution tank with level and temperature controls, standard size tank for extracting quantities of water, the being-processed material and the treating material from their sources in measured quantities, and further includes an arrangement whereby the containers and the measurement devices may be rinsed after each determination is made. Signals from a timer as well as signals generated in response to completion of one or more steps in the process are used to control the operational sequence of the apparatus.

BACKGROUND AND DESCRIPTION OF THE INVENTION

The present invention relates to an apparatus for measuring the viscosity of solutions or dispersions of substances, and more particularly substances such as modified and derivatized starches which, when properly conditioned, provide aqueous mixtures having viscosities indicative of the degree of modification or derivatization of the starches.

Commercially, a wide variety of complex chemicals such as high molecular weight polymers and the like are recovered from natural sources or produced synthetically. In such processes, particularly those carried out continuously, optimum processing efficiency depends upon the operation being provided with at least some in-process control. Efficient in-process control, in turn, depends upon auxiliary measurment systems being provided which are capable of yielding information concerning the quality of certain key, or possibly all, starting, intermediate, and product streams. The designs of available auxiliary measuring systems vary considerably, and several systems usually are available which can be used to measure one or more of the characteristic physical and chemical properties of a particular substrate. The auxiliary system or systems utilized in a given situation, of course, generally are dictated by considerations of the reliability of the information gained, the complexity of the over-all reaction, and, in the final analysis, process economics.

Reactions of starch with other materials such as oxidizing agents, acids, hydrolyzing enzymes and the like, for example, are quite complex. Consequently, in processes carrying out such reactions on a continuous basis, it is highly desirable that means be provided to control the operation. Control techniques have been set up operating in response to deviations of a particular property of the starch reaction products, such as their viscosity outside a pre-determined range. However, control of continuous starch reactions heretofore often has not been completely satisfactory. The problem usually stems from an inability of the more economical measuring systems, upon which control relies, to provide the desired information, such as viscosity readings, rapidly and/or accurately enough.

Accordingly, the main object of the present invention is to provide an apparatus which can measure the viscosity of liquids accurately and rapidly. Another object of the present invention is to provide a viscosity measurement apparatus which is capable of controlled cyclic operation. A particular object of the present invention is to provide a viscosity measurement apparatus which can be used as an effective viscosity monitor for starch reaction processes.

Broadly described, the present invention constitutes an apparatus for measuring the viscosity of a conditioned suspension or solution of a study substance comprising a receiver for obtaining a predetermined volume of the material to be sampled from a source through which a portion of the entire mass of processed material is being continuously circulated, a receiver for withdrawing and storing a measured amount of a treating reagent from a mass of reagent being stored, a mixing tank for allowing a reaction between the sample of material to be studied and the treating reagent to produce a treated sample having characteristic flow properties and means for determining such flow properties under standard conditions. In addition, the apparatus preferably includes a timer so that this procedure may be repeated in the same sequence, a rinsing system for the various tanks, means for maintaining the temperatures and levels of the various reagents in desired states, and the like.

In the preferred embodiments the timer and consequently the viscosity measuring apparatus, is capable of cyclic operation. According to such embodiments also, the reservoir for collecting treated samples after given flow properties have been determined includes means for discharging the samples in response to signals from the timer. Measurement error in the cyclic operation is maintained within suitable limits by further providing controllable means, also operated by signals from the timer, for rinsing with a cleansing liquid, the sample-soiled surfaces of the apparatus between the handling of successive samples. The rinsing liquid suitably may be a solvent or mere mechanical wash liquid. In instances wherein the apparatus is employed to measure the viscosity and fluidity of starch pastes, for example, water constitutes a suitable rinse liquid. Preferred embodiments of this type of the apparatus of the present invention are capable of rapid, accurate operation and thus advantageously provide automatically controlled systems which can be used for monitoring continuous processes such as those continuous processes for producing modified starches involving reactions of starch with acids, enzymes, or oxidizing agents.

The invention will be more fully understood from the following description of an embodiment of the apparatus of the present invention as employed to measure the viscosity of starch pastes, the description being made with reference to the attached figures of which:

FIG. 1 is a schematic flow diagram of the system; and
FIG. 2 is a circuit diagram of the control elements of the system.

Referring to FIG. 1, tank 200 is a storage reservoir for water used in the system. The water storage system is provided with means for controlling water temperature including a temperature sensing element, namely thermometer 207 located in water circulation line 201, a heating element 206 immersed in tank 200, and a controller 208. Tank 200 also is provided with means for maintaining the water level in the tank. The water level control means, as described more fully below, includes a conductivity gap probe 45 which signals a solenoid-operated valve 64 located in water inlet line 204 when water addition is required.

Tank 300 is a storage reservoir for a standard dilution or treating liquid used to condition study samples introduced into the system. In the case of starch, the standard conditioning liquid is an aqueous caustic solution (e.g. 0.4 N aqueous sodium hydroxide) and is employed in the system for converting starch to a paste under a standard set of conditions. The use of standard conditions to form aqueous alkali pasted starch samples provides, as described hereinafter, means for measuring the viscosity and/or relative alkali fluidity of the various samples. Caustic in tank 300 is maintained at a constant temperature by a control system including a caustic temperature sensing element, i.e. thermometer 307 in caustic circulation line 301, a heating element 306 immersed in tank 300, and a controller 308 operably connected to elements 306 and 307. Caustic storage tank 300 is provided with a level control such as a conductivity gap probe 49 adapted by virtue of its placement within the tank to signal when additional caustic is needed. Caustic solution is withdrawn from tank 300 through line 301 and passed by pump 302 through valve (3-way) 79 and line 304 to a standard liquid measuring cylinder 303 from which excess caustic overflows through line 305 and returns by gravity flow to tank 300. Valve 79 is a 3-way valve which can be opened to allow caustic to flow through it from cylinder 303 by gravity into line 309. This system provides means for adding an accurately measured volume of a standard caustic conditioning solution of known concentration to the mixing chamber 95.

A reservoir of aqueous starch slurry desired to be studied and sampled is provided by continually circulating a portion of the entire slurry by pump 82 through one side of diaphragm valve 77 in line 81, the slurry stream in the process traversing a loop containing a main slurry source (not shown) such as a reaction product discharge line of a process. Valve 77 serves as a feed valve for a starch study sample measuring and collection means in the form of a measuring tube 84. A narrow probe tube 86 extends downwardly into starch sample measuring tube 84. Probe 86 is provided to remove starch slurry in excess of the sample volume desired to be collected and studied. It is connected through valve 72 in line 87 to a vacuum effective to remove excess slurry. Probe tube 86 can be adapted by electrically or manually-operated conventional means not shown to be raised or lowered. Water can be introduced into the top of measuring tube 84 via line 88 or 92. Line 92 handles water overflowing by gravity from a dilution water measuring tube 91 for purpose of cleaning tube 84. Line 88 is a bottom gravity discharge line from dilution water measuring tube 91 and contains 3-way, flow control valve 73. Water is passed by pump 202 from reservoir 200 to measuring tube 91 through a solenoid-operated valve 63 located in line 201.

Starch slurry discharge means from study sample measuring and collecting tube 84 is provided by line 93 and diaphragm valve 76 through which slurry discharge from tube 84 passes by gravity. Upon leaving tube 84, the starch sample enters the mixing chamber 95 in which sample conditioning takes place. Caustic from standard liquid measuring tube 303 passes by gravity through lines 304 and 309 and valve 79 to mixing chamber 95, and the resultant aqueous alkaline mixture is agitated by a stirrer 96 driven by motor 97. The aqueous mixture is maintained in chamber 95 for a set time period, e.g., four minutes, to allow the caustic to condition the starch, namely, to convert the starch slurry to an alkali-induced paste having a characteristic viscosity. The resultant paste then is passed to a measurement device for determining its viscosity and relative fluidity. The chamber 95 includes a drain line 98 controlled by a plug valve 75 for discharging the conditioned sample liquid. Upon discharge from chamber 95 the paste flows into and through a funnel 99. Funnel 99 has a discharge orifice tube 99t having calibrated flow characteristics. Paste then passes through funnel orifice 99t into a collection reservoir, tube 111, which includes probes 39, 41 which sense and signal when a given volume of liquid has been collected by tube 111. The probes 39–41 are so spaced vertically that the difference in heights thereof defines a standard volume, e.g., 65 ml., in tube 111. As paste from the funnel 99 flows into tube 111, the probe 39 is contacted and this signals a time measurement recorder 113. When the paste level reaches the upper probe 41, the recording means similarly is signaled that liquid volume collection has been completed. Since successive samples all have been conditioned at a given set of standard conditions, the times required for identical volumes of different paste samples to flow through the calibrated funnel orifice provides a means for directly comparing and monitoring the relative successive viscosities, and, consequently the relative degree of modification or reaction of different study samples. Collection tube 111 is provided with discharge means in the form of line 112 and 3-way valve 78 through which discharged liquid flows by gravity and is discarded.

After measuring one sample, the system is readied for measurement of the next study sample by first emptying and then rinsing starch measuring tube 84, mixing chamber 95, funnel 99, and collection tube 111 with water circulated by pump 202 from tank 200 through solenoid-operated valves 61, 62, and 63.

Valves 72, 73, 75, 76, 77, 78, and 79 are air-actuated and are controlled by solenoid-operated valves 52, 53, 55, 56, 57, 58, and 59, respectively, located in air lines 122, 123, 125, 126, 127, 128, and 129, respectively, operatively connecting the two sets of valves. Automatic cyclic control of the starch viscosity measuring device of the invention is accomplished by appropriate sequential activation of these solenoid valves, as well as solenoid valves 61, 62, 63, and 64, mixing chamber agitator motor 97, and the means for operating the recorder 113 to translate and record information on sample relative fluidity (viscosity) signaled to it by conductivity probes 39 and 41.

The means by which the above-described control of the system is accomplished is shown schematically in the circuit diagram of FIG. 2. The element designated numeral 24 is a rotary, solenoid-operated stepping switch having cam tap positions 1 through 12 and contact switches 30, 40, 50, 60, 70, 80, 90, 100, 110, 120, 130, 140, 150, 160, 170, and 180. Step switch 24 is connected across an electrical power source through a toggle switch 21. Step switch 24 is provided with an arm 23 which engages and is supported by the core 22c of a solenoid relay 22. Arm 23 and relay 22, in operation, cooperate to advance the step switch from cam tap position 1 to cam tap position 2, and so on. When coil 22w of solenoid 22 is actuated, core 22c and arm 23 supported by it are raised. Subsequent de-energization of coil 22w by operation of timing or other control circuits in the system, described hereinafter, lowers arm 23 by gravity. The falling of arm 23 moves step switch 24 to the next cam tap position. In the operation of the system, advancement of step switch 24 from one cam tap position to the next constitutes a completion of a step in the control operation in this embodiment, there are twelve steps in the operation of the system.

Step 1 of the cyclic operaton is timed and controlled by a motor-driven 10-second timer element 25. In step 1 cam tap position 1 is closed and current passes through contact 25a of timer 25 to winding 22w of solenoid 22. Motor 25m of timer 25, which breaks contact 25a five seconds after it is energized, is connected across cam switch 30 which also is closed during step 1.

Step 2 of the process is controlled by a resistance-type 5-second delay relay element 26. In step 2 cam tap switch 2 is closed and current is passed through contact 26a of relay 26 (through contact 27a of thus energized solenoid valve 27) to winding 22w of solenoid 22. Current is also passed through resistance heater 26h and relay 26. Heater 26h of relay 26 consists of a laminate of strips of metals having different coefficients of expansion designed to become sufficiently bent to cause contact 26a to be broken five seconds after current starts flowing through heater 26h.

The timing of step 3 of the control operation is done by another resistance-type delay relay element 28. Heater 28h of relay 28, when activated, gives a 15-second delay before contact 28a is broken. In step 3, cam tap switch 3 is closed and current is passed through contacts 28a to energize solenoid 22.

Step 4 of the process is controlled by a motor-driven timer element 29. In step 4 cam tap switch 4 is closed and current is passed through contact 44a of relay 44w and contact 29a of timer 29 to solenoid 22. Motor 29m of timer 29 is energized by current supplied through cam switch 40 of the step switch which also is closed during step 4. Timer 29 is designed to break contact 29a four minutes after current is supplied to timer motor 29m.

The duration control element used in step 5 of the operation is a sensing and signalling element located in the reservoir for collecting conditioned sample liquid after it flows through the orifice of the funnel 99. Here, the element is conductivity gap probe relay 39, which, as stated above, is the bottom conductivity probe in conditioned study liquid connection reservoir 111. In step 5 cam tap switch 5 is closed and current is supplied to solenoid 22 through contacts 54a of a solenoid relay 54. Cam switch 60 of the step switch also is closed at this point. When sufficient paste collects in reservoir tube 111 to complete the gap between the connections of conductivity probe 39, current flows to ground in the circuit formed by winding 51s of transformer 51, winding 54w of solenoid relay 54, and probe 39. The current in winding 54w of relay 54 breaks contact 54a of the relay and de-energizes solenoid 22, thus ending step 5.

Step 6 of the operation also is controlled by a sensing and signalling element located in reservoir 111, namely conductivity gap probe 41, which is the top conductivity probe in conditioned paste collection tube 111. In step 6 cam tap switch 6 is closed and currrent again is passed to winding 22w of solenoid 22 through contact 54a of solenoid relay 54. Cam switch 70 of the step switch is closed during step 6. When sufficient paste collects in tube 111 to contact the gap between the conductors of probe 41, current flows to ground through tthe circuit by winding 51s of transformer 51, winding 54w of relay 54, and conductivity gap probe 41. This current causes contact 54a of relay 54 to open which, in turn, de-energizes solenoid 22 and ends step 6.

Steps 7 through 12 are controlled by timer element-containing circuits previously described. Control of steps 7, 8, and 11 is provided by the operation of 15-second delay relay 28 which in these steps causes solenoid 22 to be energized by the closing of cam tap switches 7, 8, and 11 respectively. Steps 9, 10, and 12 are controlled by 5-second delay relay 26 which is placed in a completed circuit with solenoid 22 in these steps by the closing of cam tap switches 9, 10, and 12.

With regard to other elements shown in the circuit diagram of FIG. 2, elements 35, 37, and 38 are motors used for driving signal-translating components of the recorder 113. Motor 37 drives a chart (not shown) continuously when energized by the closing of a toggle switch 33. Motor 35, when activated, drives a pen in contact with the chart toward the origin or zero marking on the chart. When toggle switch 33 is closed, reverse pen drive motor 35 is energized any time the recorder pen is at any lateral position on the chart except the chart zero (origin) position. At this position motor 35 is de-energized by the operation of a micro-switch 36. Motor 38, when activated, drives the pen of the recorder in a lateral direction away (forward) from the origin or zero position of the chart. It is energized during step 6 of the process by the closing of cam switch 50 on the step switch. This movement of the pen energizes reverse pen motor 35. Forward pen motor 38, however, has a greater speed than reverse pen motor 35. Consequently, even though reverse motor 35 is operating the pen is driven forward by motor 38 at a constant and calibrated rate as long as step 6 lasts.

Transformers 42 and 47 supply the power for operating the liquid level indicator circuits in water storage tank 200 and caustic storage tank 300, respectively. Transformer 47 is connected across the main power source of the system and provides, when the system is turned on, a continuous watch on the caustic reservoir level. As long as the level in tank 300 is above the location of probe 49, current flows to ground through the circuit containing transformer winding 47s, solenoid relay winding 48w and conductivity gap probe 49. In this condition contact 48a of relay 48 is open and current is not supplied to a light 65 on a control panel for the system. When caustic level in tank 300 lowers beyond probe 49, solenoid 48 is de-energized, 48a of solenoid relay is closed, and indicator light 65 goes on.

Winding 42p of transformer 42 is connected across the main power source to the system. Winding 42s of this transformer delivers power to conductivity gap probe 45 in water reservoir 200. This circuit also contains winding 46w of a solenoid relay 46. Relay 46 is connected such that, when it is energized, contact 46a of the relay is connected in series with the winding 64w of solenoid valve 64 which controls the flow of make-up water into water tank 200. Relay 46 also is connected such that, when it is energized, contact 46a is in series with either contact 43a or 43b of another solenoid relay 43. Contact 43a of relay 43 is connected to the main power source. Contact 43b goes through cam switch 80 in step switch 24. Relay 43 is connected with its winding 43w in series with toggle switch 21, the power switch for step switch 24. When toggle switch 21 is open (step switch 24 is de-energized), contact 43a of relay 43 is closed, and the operation of water storage tank feed valve 64 continues to be controlled by conductivity probe 45. When toggle switch 21 is closed, relay 43 is energized such that contact 43a is opened and contact 43b of the relay is closed, with the result that the operation of water reservoir feed valve 64 then is controlled by cam switch 80 of step switch 24.

For calibration, the apparatus is operated in a somewhat different sequence. Among the elements used in calibration is the element designated numeral 32, a pulse counter of conventional design. It is energized for counting when toggle switch 31 is closed. The pulse counter circuit contains solenoid relay 44, whose coil 44w also is activated when the pulse counter circuit is energized. The pulse counter circuit also contains a second solenoid relay, relay 34, which similarly is activated when pulse counter 32 is energized. Activation of solenoid relays 34 and 44 opens several circuits, creates a new timing circuit for one step, and thus alters the operation of certain equipment when the apparatus is run through steps 1 to 12 by the stepping switch, the procedure used for the calibration operation. Specifically during the calibration procedure, cam switches 120 and 130, which control the operation of valves 76 (starch measuring tube discharge valve) and 77 (starch slurry feed valve) through solenoid valves 56 and 57, respectively, are completely removed from the system. Reverse chart pen motor 35 similarly is removed from the control circuits. Activation of relay 44 opens contact 44a and removes timer 29 (contact 29a circuit) from the system. Activation of relay 34 closes contact 34a. Step 4 of the operation thus is controlled not by timer 29 but by delay relay 28, which is inserted in the control circuit containing cam step switch 4 by the closing of contact 34a.

For operating the apparatus, switches 15 and 16 initially are closed. Power is supplied to the temperature control systems of the water and caustic storage systems, i.e., temperature controllers 208 and 308 and heaters 206 and 306. Power is also supplied (through transformers 42 and 47) to conductivity gap relays 45 and 47 in water tank 200 and caustic reservoir tank 300, respectively. If tank 300 contains an adequate supply of caustic, panel light 65 will be off. If it is on, caustic must be added. Maintenance of the water level in tank 200 is automatic, e.g. losses by evaporation will be compensated for by the control system. When the level in tank 200 falls below that at which probe 45 is located, contact 46a of relay 46 is closed and current flowing through contacts 43a and 46a of relays 43 and 46, respectively, activates water addition solenoid valve 64 in water feed lines 204. When sufficient water has been added, relay 46 is energized by current flowing to ground through the circuit completed through gap probe 45, and the resultant opening of contact 46a de-energizes and closes water feed valve 64.

Toggle switches 17, 19, and 33 are then closed to energize water circulation pump motor 202m, caustic circulation pump motor 302m, and recorder chart drive motor 37. Under these conditions water from tank 200 is circulated by pump 202 through one side of diaphragm valves 61, 62, and 63 in lines 201, 211, and 212, respectively, and then back to tank 200 through line 203. Caustic is circulated by pump 302 through diaphragm valve 79 into caustic measuring tube 303 from where it overflows through line 305 back into the caustic supply tank 300. The portion of line 304 between tube 303 and tank 95 is closed by valve 79. Starch slurry is circulated by pump 82 through line 81 to one side of diaphragm valve 77 and returned to its main source (not shown). Line 82 to starch measuring tube 85 is closed by valve 77 and no starch flows to tube 84.

The apparatus operator determines the starch slurry density (° Bé.) with a hydrometer, and after consulting a standard table of volume versus density for starch slurries, he sets the unit for sample volume which gives the most reliable reading of relative viscosity. This volume may vary from starch to starch depending upon the type of modification. Sample volume setting is accomplished by raising or lowering vacuum probe tube 86 and adjusting the height its lower end extends above the bottom of starch sample measuring tube 84. Adjustment can be made manually or by adapting the probe tube 86 with a drive motor (not shown).

The procedure heretofore described places the apparatus in a standby condition. Actual monitoring is begun by closing toggle switch 21. With toggle switch 21 closed, current flows through winding 43w of solenoid relay 43 with the result that contact 43a is broken and contact 43b is completed. Winding 64w of water feed valve 64 thus is cut into the circuit containing cam switch 80, and the operation of valve 64 thereafter is controlled by cam switch 80.

What other elements operate at this instant depends upon the actual position of the step switch, which position in turn depends upon where the switch was in its cycle when the apparatus was last turned off. If not at position 1, it can be set there by manual or electrical means (not shown). Assuming the step switch 24 is set at position 1 (step 1), tap contact 1 and cam switch 30 on rotary tap switch 24 are energized, and this sends current through closed contact 25a and motor 25m of 10-second timer 25. Through contact 25a of timer 25 current is sent to the coil 22w of solenoid 22 and arm 23 of step switch is moved to the up position. Motor 25m begins its operation which will break contact 25a, de-energize solenoid 22, and end step 1 in 10 seconds.

During step 1, cam switches 90, 100, 110, 130, and 140 on step switch 24 are closed resulting in solenoid valves 52, 53, 55, 57, and 58 being energized and opened. The opening of valve 57 allows air into line 127. This causes valve 77 to open which allows starch slurry to flow through line 82 into measuring tube 84. At the same time, valve 72 in vacuum line 87 has been opened by air entering line 122 through energized valve 52. This causes starch in excess of the sample volume setting to be sucked out of measuring tube 84 through probe tube 86. Meanwhile the rest of the system downstream from measuring tube 84 (i.e. tank 95 and collection tube 111) is being emptied of starch sample treated in the previous cycle. Emptying of tank 95 is achieved by air entering line 125 through energized solenoid valve 55 and opening valve 75. Tube 111 is emptied by valve 78 opening in response to air entering line 128 through energized valve 58. The energizing of solenoid valve 53 and the resultant opening of air line 123 causes valve 73 to open and allow a measured quantity of water in dilution tube 91 to flow into tube 84. At the end of ten seconds, motor 25m breaks contact 25a of timer 25 with the result that solenoid 22 is de-energized and arm 23 falls, ending step 1. The falling of arm 23 moves the cams of step switch 24 to the No. 2 position.

In the No. 2 position of switch 24, cam tap switch 2 is closed, energizing solenoid 22 (and raising arm 23 of switch 24) by current passing through the circuit completed by contact 26a and contact 27a of solenoid relay 27. Relay 27 is energized and closed by current passing through its winding 27s. Current also is sent through resistance heater 26h of relay 26 and the heating of heater 26h begins, which in five seconds will cause contacts 26a to break and end step 2. During step 2 cam switches 90 and 100 of step switch 24 also are closed, energizing valves 52 and 53 and thus opening valves 72 and 73. During step 2, therefore, dilution water from tube 91 continues to flow into starch measuring tube 84, while excess liquid is removed from tube 84, through suction probe 86. Cam switch 80 is also closed, allowing make-up water to be added to tank 200 if needed. At the end of five seconds, relay 26 opens contacts 26a (and contacts 27a and relay 27) which de-energizes solenoid 22, causes arm 23 to fall, and ends step 2.

The falling of arm 23 moves the cams of switch 24 to cam tap position 3 and step 3. The closing of cam tap position 3 sends current to solenoid 22 (raising arm 23) through contact 28a of 15-second delay relay 28. Current in a parallel circuit is passed through heater 28h of relay 28, starting the heating which will cause contacts 28a to be opened after 15 seconds and thus end step 3. During step 3 the main operation carried out is the draining of starch from tube 84 to pasting tank 95. This occurs as a result of cam switch 120 closing, which energizes valve 56, which in turn opens valve 76. Cam switch 100 also is closed. A measured quantity of water (e.g. 10 milliliters) thus flows from tube 91 into tube 84 to act as a starch wash stream and aid its discharge through valve 76. Cam switch 80 also is closed so water addition through valve 64 to water tank 200 can continue if the level is low. The other system energized is the water wash system for funnel 99. This is effected by cam switch 160 closing which energizes and opens valve 61.

At the end of 15 seconds relay 28 breaks contact 28a, de-energizing solenoid 22. This causes arm 23 to drop, ends step 3, and moves the cams of switch 24 to cam tap position 4.

The closing of cam tap position 4 sends current to solenoid 22 (raising arm 23) through closed contact 44a of relay 44 and contact 29a of timer 29. Cam switch 40 is closed sending current to both motor 29m of timer 29 and motor 97 which drives agitator 96 in mixing chamber 95. Cam switch 120 again is closed and discharge of starch slurry from tube 84 to chamber 85 is completed. Cam switch 80 is closed activating the level control system of tank 200. Cam switch 150 also is closed energizing valve 59. The activation of valve 59 causes valve 79 to be moved to a position where line 304 is closed to line 301 and opened to line 309. The measured quantity of caustic solution in tube 303 consequently flows into mixing chamber 95 and is thoroughly mixed with starch slurry by agitator 96. Addition of the caustic causes the starch present to become gelatinized and converts the liquid in mixing chamber 95 to a paste. Mixing continues until timer motor 29m opens contact 29a. The resultant de-energization of solenoid 22 causes arm 23 to drop and move the cams of switch 24 to tap position 5.

When cam tap position 5 is energized, current is passed through coil 22w of solenoid 22 (raising arm 23) via the closed contact 54a solenoid relay 54. Cam switch 110 has been closed, activating solenoid valve 55. This causes valve 75 to open and allow paste to drain from mixing chamber 95 through funnel 99 into collection tube 111. Discharge valve 78 of tube 111 being closed, paste flowing into collection tube 111 is collected. Cam switch 60 is closed and bottom probe conductivity relay 39 is sensitized (i.e. current will flow through it to ground from winding 51s of transformer 51 when the gap between its conductors is completed by the rising level of paste collecting in tank 111). Meanwhile, the level control system of water tank 200 remains sensitized by cam switch 80 again being closed. Caustic discharge valve 79 has been returned to a position where line 304 is closed to line 303 and opened to line 301. Tube 303, thus again fills with caustic solution circulating from tank 300.

When the level of collected paste in tube 111 reaches bottom probe 39, current flows through the circuit containing it and coil 54w of relay 54, causing contacts 54a of the relay to open. The opening of contacts 54a de-energizes solenoid 22 and causes arm 23 to drop and move the cams of switch 24 to tap position 6.

With the closing of cam tap position 6, current again is passed to solenoid 22 (arm 23 is raised) through closed contact 54a of relay 54. Cam switch 110 is again closed so paste continues to drain from mixing chamber 95 and passes through funnel 99 into collection tube 111. Meanwhile, cam switch 70 has been closed sensitizing upper conductivity gap probe 41 in tube 111. Cam switch 50 also has been closed activating forward pen motor 38. Motor 38 drives the pen of recorder 113 away from the origin of the chart and energizes reverse pen motor 35 by causing micro-switch 36 to close. The combined effect of motors 38 and 35 is to move the pen of chart 113 in a lateral (forward) direction at a constant rate proportional to the difference in the speeds of the two motors. The recorder pen continues to move and record the time its drive motors operate until the level of paste flowing through funnel 99 and collecting in tube 111 reaches the level of upper probe 41. The resultant current to ground through probe 41 energizes relay 54 causing contact 54a to open. Solenoid 22 thus is de-energized, arm 23 falls, and the cams of step switch 24 move to tap position 7. With this operation forward pen motor 38 is de-energized. Reverse pen motor 35 remains energized, however, and starts returning the recorder pen to the origin of the chart. By making each division on the recorder chart which the pen was deflected during step 6 equal to a given time period, e.g. one second, the length of pen deflection inked on the recorder chart provides a measurement in terms of seconds which can be compared with corresponding measurements obtained for other starch samples of equal volume (controlled by the distance between top probe 41 and bottom probe 39 and the diameter of the time tube 111—typically about 65 milliliters) and provide meaningful information regarding the samples tested, e.g. indicate the degree of modification of starch samples and thus serve as a means for continuous in-process control for processes when starch is modified by acid, enzyme, or hypochlorite treatment. As in the previous steps, cam switch 80 is closed during step 6 and water, if needed, can be added to tank 200.

The closing of cam tap position 7, if contact 28a of 15-second delay relay 28 is closed, energizes solenoid 22 and raises arm 23. If heater 28h of relay 28 has not cooled enough to close contact 28a, the energization of solenoid 22 will await this occurrence. While this may render the timing of this step random, this is not of importance, since step 7 is merely a wash step of the operation. At cam tap position 7, cam switches 100 and 180 are both closed, activating valves 53 and 63, respectively. Activation of valve 63 opens it. Valve 53 when actuated, in turn, opens valve 73 so water from tank 200 is allowed to pass through line 201 and opened valve 63 into tube 91 and from there through valve 73 and line 88 into starch measuring tube 84. Cam switch 90 is closed, causing valve 52 to be energized and valve 72 to be opened with the result that water is withdrawn through and washes vacuum probe 86 when the water level in tube 84 reaches its bottom end. Water which the probe 86 cannot remove overflows from tube 84 through line 85 to a drain (not shown). Residual paste is drained from mixing chamber 95 by cam 110 closing, causing valve 55 to be energized and open valve 75. Paste draining through valve 75 passes through funnel 99 into tube 111. Meanwhile, funnel 99 is rinsed by water circulating from tank 200 through line 201 and passing via line 222 through valve 61 which has been energized and opened by cam switch 160 being closed. 15 seconds after heater 28h of relay 28 receives current in step 7, contact 28a is broken, solenoid 22 is de-energized, and arm 23 falls to move the cams of switch 24 to tap position 8.

At tap position 8, current again is sent to solenoid 22 (raising arm 23) through contact 28a of 15-second delay relay 28 as soon as heater 28h is sufficiently cool to cause the contact to close. During this step, cam switches 90, 100, and 180 again are closed so water continues to be passed into tube 84 via open valves 63 and 73 and to be removed via suction probe 86 and overflow line 85. Cam switch 170 is closed, energizing and opening valve 62. Water thus flows through valves 62 and line 222 into mixing chamber 95. Agitator motor 97 is energized by the closing of cam switch 40 with the result that rinse water added to mixing chamber 95 is thoroughly mixed with residual paste in the tank. Meanwhile, cam switch 140 is closed and, via the resultant activation of valve 58, valve 78 is opened to allow liquid to drain (to waste) from collection tube 111 through line 112. 15 seconds after current is supplied to heater 28h of heater 28, contact 28a is opened, solenoid 22 thus is de-energized, and arm 23 falls, moving the cams of step switch 24 to cam tap position 9.

At cam tap position 9, current is passed to solenoid 22 through closed contact 26a of 5-second delay relay 26 and closed contact 27a of the thereby energized solenoid relay 27. Arm 26 thus is raised. During step 9 cam switches 90, 100, and 180 again are closed and rinse water circulates through tube 84 as in steps 7 and 8. Rinse water continues to be added to mixing tank 95 and thoroughly be mixed with residual paste. This is accomplished by the closing of cam switches 170 (energizes and opens valve 62) and 40 (energizes agitator motor 97). At the end of five seconds, relay 26 opens contact 26a (and contact 27a), de-energizes solenoid 22 thereby, and causes arm 23 to fall and advance the cams of switch 24 to tap position 10.

In step 10, solenoid 22 is energized and arm 23 is lifted by current again flowing through closed contact 26a of 5-second delay relay 26 and the thus closed contact 27a of solenoid relay 27. During this step water rinsing of tube 84 continues as in steps 7, 8 and 9 by the closing of cam switches 90, 100, and 180. Drain valve 75 of mixing tank 95 is opened (cam switch 110 is closed, activating valve 55) and liquid drains from tank 95 through funnel 99 into collection tube 111. Funnel 99 meanwhile is rinsed by water circulated through valve 62 which has been energized and opened by the closing of cam switch 170. After five seconds, solenoid 22 is de-energized by the opening of contact 26a of delay relay 26, and arm 23 falls, moving step switch 24 to cam tap position 11.

At cam tap position 11, solenoid 22 is energized by current passing through contact 28a of 15-second relay 28, and arm 23 of switch 24 is raised and held in the up position for 15 seconds. During this period, cam switches 100, 110, 120, 140, and 170 are closed. Liquid is drained from tube 91, tube 84, chamber 95, and tube 111 by the opening of valves 73, 76, 75, and 78, respectively, while rinse water is introduced into the system at tube 84 (through valve 73 in line 88) and at chamber 95 (through valve 62 in line 222). After 15 seconds contact 28a of relay 28 is broken, solenoid 22 is de-energized, and arm 23 falls to move the switch to cam tap position 12.

The closing of cam tap position 12 sends current to solenoid 22 through closed contact 26a of 5-second delay relay 26 and thus closed contact 27a of solenoid relay 27. Arm 23 is raised and held in an upward position for five seconds. During this period, cam switches 110 and 120 are closed. Discharge valves 76 and 75 of tube 84 and mixing tank 95 thus are opened and draining of these containers continues. Cam switch 100 also is closed. Tube 84 thus is given a final wash by water entering through line 88 and opened valve 73. After five seconds contact 26a is broken, solenoid 22 is de-energized, and the arm 23 falls, moving step switch 24 to cam tap position 1 and thus completing a cycle of the control procedure.

The calibration system operates as follows: Toggle switch 31 is thrown to energize microflex pulse counter 31. The microflex pulse counter is adapted to count the number of pulses/steps that are used in a calibration test of the instrument. Energizing the microflex pulse counter circuit sends current to and energize coils 44w and 34w of solenoid relays 44 and 34, respectively. The function of these two relays is to prevent certain equipment from operating during the calibration procedure. To be more specific, energizing these relays during the procedure opens contact 44b (taking reverse pen motor 35 out of the control circuits); opens contact 44d (whereby drain valve 76 of tube 84 cannot be opened), and opens contact 44d (whereby starch feed valve to tube 84 cannot operate). Contact 44a also is opened. With this (opening of contact 44a) and the closing of contact 34a by the activation of relay 34, the timing circuit for cam tap position 4 contains 15-second delay relay 28 instead of timer 29.

During the calibration operation, starting with step 1, the system runs through three rotations of step switch 24, as determined by counting pulses. The pulses are counted from the activation of solenoid 22, i.e. each time solenoid 22 is energized one count is registered on the counter. Instead of starch paste, the calibration procedure uses the standard caustic solution from tank 300. The recorder chart accumulates the time required for three samples of caustic to drain through funnel 99. Variations in the accumulative time indicate whether funnel orifice 99t is fouled or unduly soiled and needs to be removed and carefully cleaned.

Further embodiments of this invention which do not depart from the spirit and scope thereof, of course, will be apparent to those skilled in the art; accordingly, the foregoing is to be interpreted as illustrative only.

What is claimed is:

1. An apparatus for receiving at least one sample of a material being-processed for chemically treating such sample under controlled conditions with a treating reagent to produce a treated sample, and measuring at least one characteristic of the treated sample, said apparatus including first means for receiving a predetermined amount of a material being-processed, second means for receiving a measured amount of a treating reagent, a mixing tank for mixing said reagent and said material for reaction therebetween to produce a treated sample, said first and second means having associated therewith means for supplying said material and said reagent to said mixing tank, means for removing said treated sample produced from said tank under predetermined conditions, and third means for receiving at least a portion of said treated sample, said third receiving means having associated therewith means for determining the flow time required for said portion of said treated sample to reach a given level in said third means, and means offering a given resistance to fluid flow associated with said removing means and disposed between said third receiving means and said mixing tank.

2. An apparatus as defined in claim 1 which further includes means for repeatedly receiving a plurality of said material samples and successively determining the characteristic flow time of each of said samples.

3. An apparatus as defined in claim 2 which further includes display means for displaying each of the flow times associated with each sample for comparison therebetween.

4. An apparatus as defined in claim 1 which further includes means for rinsing at least one of said receiving means after the contents thereof have been removed.

5. An apparatus as defined in claim 1 which further includes volume control means for establishing a predetermined but variable volume in at least one of said receiving means.

6. An apparatus as defined in claim 1 in which said sample receiving means has operatively associated therewith means for diluting the sample held therein with a predetermined volume of a diluent.

7. An apparatus as defined in claim 1 which further includes means for receiving a succession of samples, said means being operable in response to a signal indicating completion of the determination of said flow time.

8. An apparatus as defined in claim 1 in which said receiving means for said treating reagent includes control means associated therewith for maintaining said reagent under predetermined conditions of temperature and volume.

9. An apparatus as defined in claim 1 in which means are associated with said first receiving means for supplying a sample thereto, said supply means communicating continuously with the product being sampled.

10. An apparatus as defined in claim 1 which further includes display means for indicating the flow time measured by said apparatus.

11. An apparatus as defined in claim 1 in which said resistance means is in the form of a funnel having a standard sized orifice therein.

References Cited

UNITED STATES PATENTS

| 2,712,752 | 7/1955 | Hage | 73—55 |
| 3,074,266 | 1/1963 | Sadler et al. | 73—55 |
| 3,163,172 | 12/1964 | Buzzard | 73—54 X |
| 3,187,563 | 6/1965 | Tobias | 73—56 |

FOREIGN PATENTS

| 704,765 | 3/1954 | Great Britain. |

S. CLEMENT SWISHER, Primary Examiner

J. W. ROSKOS, Assistant Examiner

U.S. Cl. X.R.

23—253; 127—23; 137—92

UNITED STATES PATENT OFFICE
CERTIFICATE OF CORRECTION

Patent No. 3,521,482   Dated July 21, 1970

Inventor(s)   Gene M. Griffith and Roger S. Leiser

It is certified that error appears in the above-identified patent and that said Letters Patent are hereby corrected as shown below:

Col. 1, line 59 the word "substrate" should be --substance--.

Col. 4, line 67 the word "operaton" should be --operation--.

Col. 5 line 49 the word "tthe" should be --the--.

Col. 7 line 15 the word "lines" should be --line--.

Col. 8, line 70 the number "85" should be --95--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents